United States Patent
Ozasa

(10) Patent No.: US 10,727,711 B2
(45) Date of Patent: Jul. 28, 2020

(54) MOTOR ROTOR, SUPERCHARGER, AND METHOD OF MANUFACTURING MOTOR ROTOR

(71) Applicant: IHI Corporation, Koto-ku (JP)

(72) Inventor: Takuya Ozasa, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/099,515

(22) PCT Filed: Jul. 19, 2017

(86) PCT No.: PCT/JP2017/026062
§ 371 (c)(1),
(2) Date: Nov. 7, 2018

(87) PCT Pub. No.: WO2018/021104
PCT Pub. Date: Feb. 1, 2018

(65) Prior Publication Data
US 2019/0165629 A1 May 30, 2019

(30) Foreign Application Priority Data
Jul. 27, 2016 (JP) .................. 2016-147247

(51) Int. Cl.
*H02K 1/30* (2006.01)
*H02K 15/03* (2006.01)
(Continued)

(52) U.S. Cl.
CPC ............... *H02K 1/30* (2013.01); *F02B 39/10* (2013.01); *H02K 1/27* (2013.01); *H02K 1/2733* (2013.01); *H02K 15/03* (2013.01)

(58) Field of Classification Search
CPC ........ F02B 39/10; H02K 1/27; H02K 1/2733; H02K 1/30; H02K 15/03
See application file for complete search history.

(56) References Cited

U.S. PATENT DOCUMENTS

| 4,930,201 A | 6/1990 | Brown |
| 5,506,557 A | 4/1996 | Sakaguchi et al. |

(Continued)

FOREIGN PATENT DOCUMENTS

| CN | 1928334 A | 3/2007 |
| CN | 101473515 A | 7/2009 |

(Continued)

OTHER PUBLICATIONS

International Search Report dated Oct. 10, 2017 in PCT/JP2017/026062, 1 page.

*Primary Examiner* — Brandon D Lee
(74) *Attorney, Agent, or Firm* — Oblon, McClelland, Maier & Neustadt, L.L.P.

(57) ABSTRACT

A motor rotor is configured to include a tubular inner sleeve, an annular magnet mounted on the outside of the inner sleeve in a radial direction of the inner sleeve, and a ring member disposed on the outside of the magnet in an axial direction of the inner sleeve and mounted on the outside of the inner sleeve in the radial direction of the inner sleeve. A linear expansion coefficient of the inner sleeve is higher than the linear expansion coefficient of the magnet. The ring member is mounted on the inner sleeve by shrinkage-fitting, and a gap is provided between the ring member and the magnet in the axial direction of the inner sleeve.

6 Claims, 3 Drawing Sheets

(51) Int. Cl.
  *H02K 1/27* (2006.01)
  *F02B 39/10* (2006.01)

(56) References Cited

U.S. PATENT DOCUMENTS

| | | | |
|---|---|---|---|
| 5,898,990 A * | 5/1999 | Henry | H02K 1/2733 |
| | | | 29/598 |
| 2005/0062353 A1 | 3/2005 | Brown | |
| 2009/0139079 A1 | 6/2009 | Shibui et al. | |
| 2009/0195102 A1 | 8/2009 | Shibui et al. | |
| 2010/0209872 A1* | 8/2010 | Kuhn | A61C 1/06 |
| | | | 433/131 |
| 2011/0254399 A1 | 10/2011 | Blanc et al. | |
| 2014/0090626 A1 | 4/2014 | An et al. | |

FOREIGN PATENT DOCUMENTS

| | | |
|---|---|---|
| CN | 101523699 A | 9/2009 |
| CN | 202798208 U | 3/2013 |
| JP | 5-267046 A | 10/1993 |
| JP | 2000-201444 A | 7/2000 |
| JP | 2007-336737 A | 12/2007 |
| JP | 2007-336738 A | 12/2007 |
| JP | 2010-200456 A | 9/2010 |
| JP | 2012-500613 A | 1/2012 |
| JP | 2013-24059 A | 2/2013 |
| JP | 2014-64428 A | 4/2014 |
| JP | 2015-211612 A | 11/2015 |
| JP | 2016-101062 A | 5/2016 |

\* cited by examiner

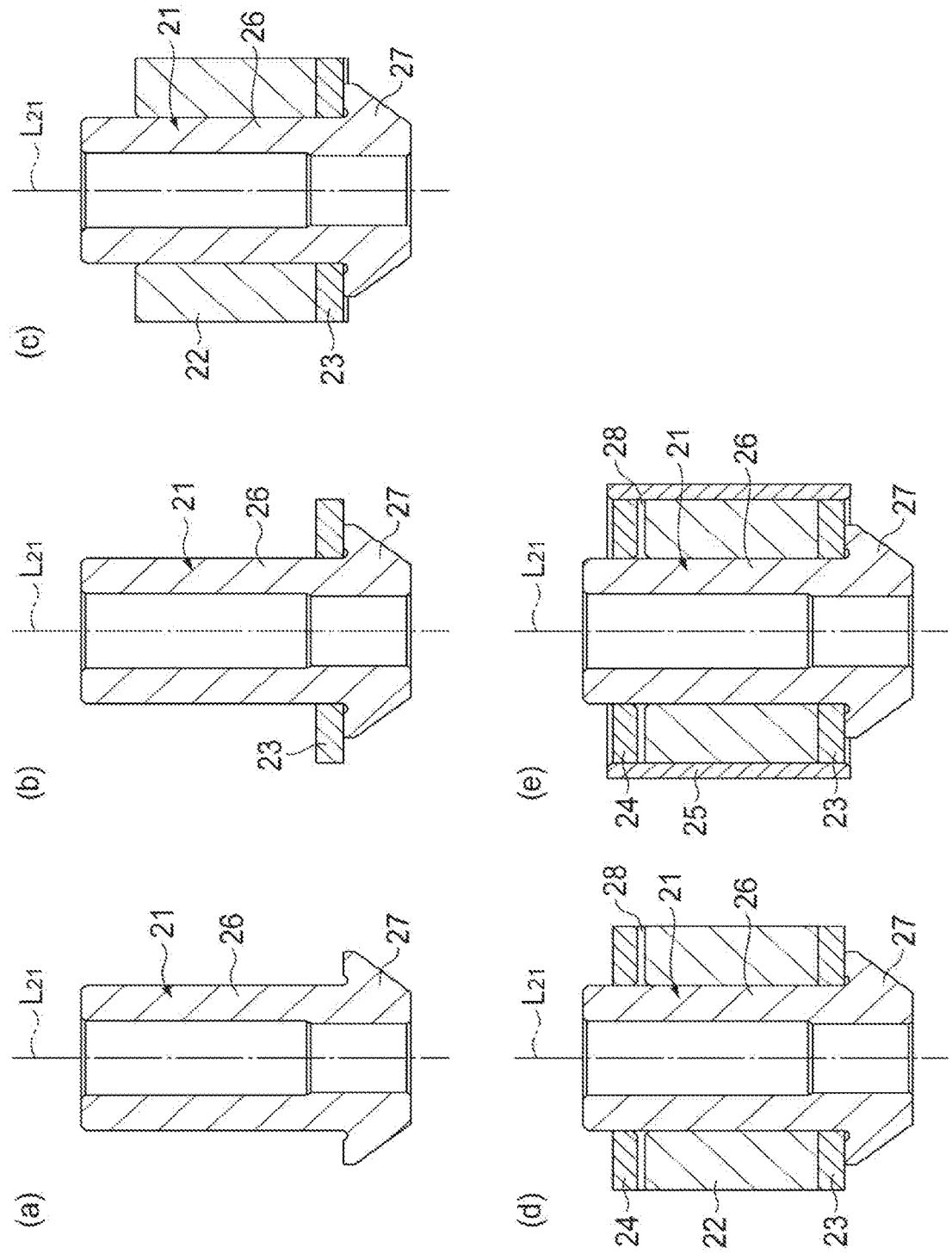

MOTOR ROTOR, SUPERCHARGER, AND METHOD OF MANUFACTURING MOTOR ROTOR

TECHNICAL FIELD

The present disclosure relates to a motor rotor, a supercharger, and a method of manufacturing the motor rotor. This application is based on Japanese Patent Application No. 2016-147247 filed on Jul. 27, 2016. This application claims benefit of priority to the application. The entire contents of which are hereby incorporated by reference.

BACKGROUND ART

From related art, an electric supercharger equipped with an electric motor that adds rotational driving force to a rotary shaft connected to a compressor wheel in a supercharger has been known (see, for example, Patent Literature 1). The electric motor mounted on a supercharger described in Patent Literature 1 includes a motor rotor (a rotor) fixed to the rotary shaft. The motor rotor includes an inner sleeve mounted on the rotary shaft, a permanent magnet which surrounds the inner sleeve around an axis, an end ring (a ring member) disposed on the outside of the permanent magnet in an axial direction of the inner sleeve and shrink-fitted to an outer periphery of the inner sleeve.

CITATION LIST

Patent Literature

Patent Literature 1: Japanese Unexamined Patent Publication No. 2007-336737

SUMMARY OF INVENTION

Technical Problem

In the related art, the inner sleeve is inserted through an opening portion of the end ring. Also, the end ring is shrink-fitted to the inner sleeve. At the time of the shrinkage-fit, when the end ring of a heated state is cooled, the end ring contracts in a radial direction and is fastened to the inner sleeve. At the time of the shrinkage-fit, since a part of heat of the end ring of a high-temperature state is transmitted to the inner sleeve, the inner sleeve is heated. Therefore, the inner sleeve expands.

When the inner sleeve is cooled, the end ring fastened to the inner sleeve moves in the axial direction of the inner sleeve in accordance with the contraction of the inner sleeve. Therefore, a magnet adjacent to the end ring is pressed by the end ring. When the magnet is pushed by the end ring, compressive force acts on the magnet in the axial direction of the inner sleeve. If the compressive force acting on the magnet increases, there is a risk of cracking in the magnet.

The present disclosure describes a motor rotor capable of preventing compressive force from being generated in a magnet at the time of shrinkage-fit of an end ring, a supercharger, and a method of manufacturing the motor rotor.

Solution to Problem

A motor rotor according to an aspect of the present disclosure includes a tubular inner sleeve, an annular magnet mounted on the outside of the inner sleeve in a radial direction of the inner sleeve, and a ring member disposed on the outside of the magnet in an axial direction of the inner sleeve and mounted on the outside of the inner sleeve in the radial direction of the inner sleeve, in which a linear expansion coefficient of the inner sleeve is higher than the linear expansion coefficient of the magnet, the ring member is mounted on the inner sleeve by shrinkage-fitting, and a gap is provided between the ring member and the magnet in the axial direction of the inner sleeve.

Effects of Invention

According to the present disclosure, even if the inner sleeve contracts with the shrinkage-fit, since the gap is provided between the magnet and the ring member, a compressive force does not act on the magnet.

BRIEF DESCRIPTION OF DRAWINGS

FIG. 3 is a view illustrating an assembling procedure of the motor rotor.

DESCRIPTION OF EMBODIMENTS

Figure 1:
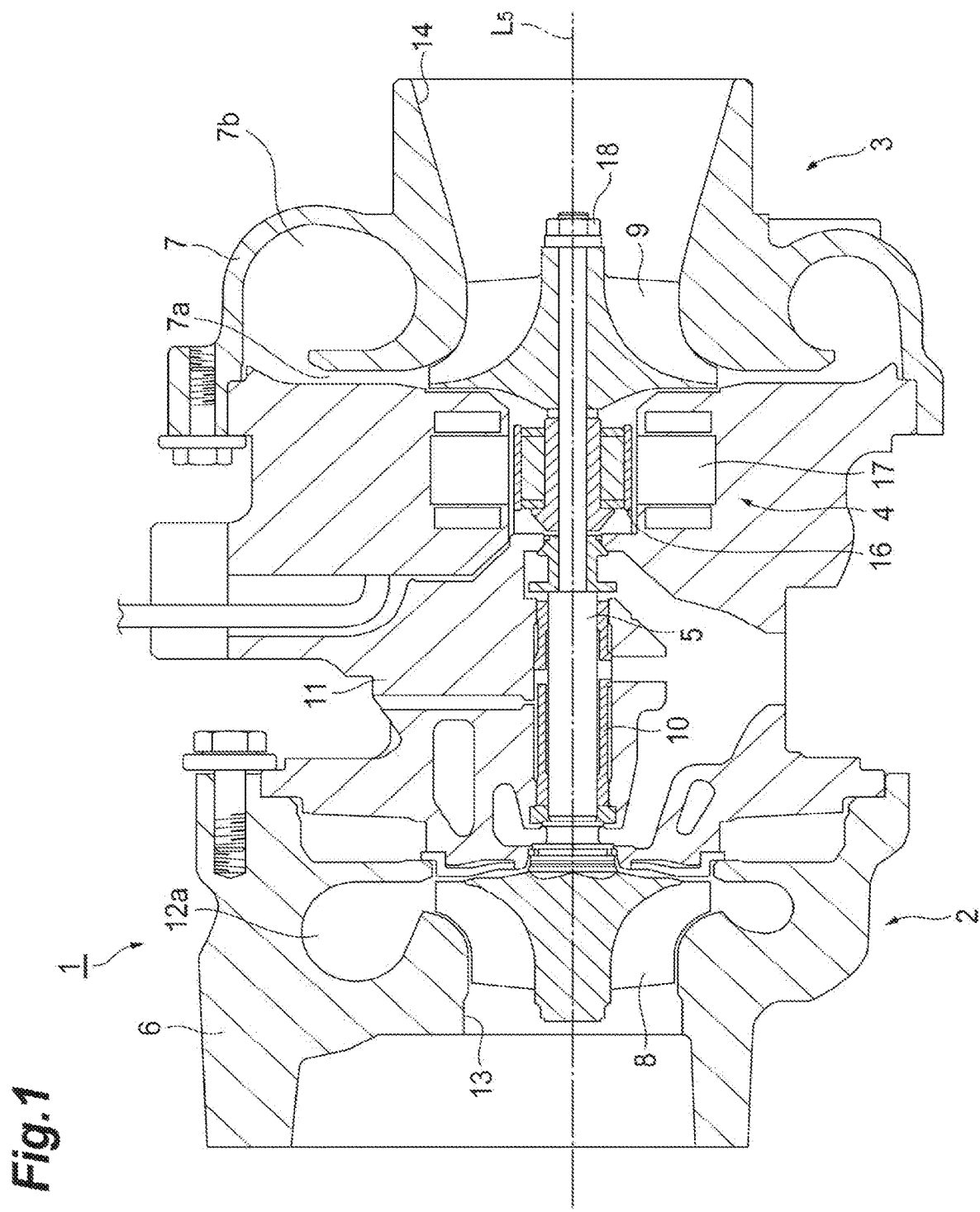
FIG. 1 is a sectional view illustrating an electric supercharger equipped with an electric motor including a motor rotor according to an embodiment of the present disclosure.

A motor rotor according to an aspect of the present disclosure includes a tubular inner sleeve, an annular magnet mounted on the outside of the inner sleeve in a radial direction of the inner sleeve, and a ring member disposed on the outside of the magnet in an axial direction of the inner sleeve and mounted on the outside of the inner sleeve in the radial direction of the inner sleeve, in which a linear expansion coefficient of the inner sleeve is higher than the linear expansion coefficient of the magnet, the ring member is mounted on the inner sleeve by shrinkage-fitting, and a gap is provided between the ring member and the magnet in the axial direction of the inner sleeve.

In the motor rotor, the gap is interposed between the ring member and the magnet. According to this configuration, when the ring member is shrink-fitted to the inner sleeve, even if the ring member moves to the magnet side with contraction of the inner sleeve, the magnet is not pressed by the ring member. Therefore, no compressive force is generated in the magnet.

In some embodiments, the motor rotor may include a pair of the ring members disposed on both sides with the magnet interposed therebetween in the axial direction of the inner sleeve, and a tubular exterior member which covers the magnet and the pair of ring members from the outer side in the radial direction of the inner sleeve, in which the gap may be provided on at least one side in the axial direction of the inner sleeve. According to this configuration, the gap is provided on at least one side in the axial direction of the inner sleeve. Therefore, the magnet is not pushed from both sides. Further, according to this configuration, the magnet is covered with the exterior member from the outer side in the radial direction. Furthermore, the magnet is covered with a pair of ring members from both sides in the axial direction of the inner sleeve. Therefore, the magnet can be protected.

Further, a supercharger according to another aspect of the present disclosure is a supercharger equipped with an electric motor including the motor rotor, the supercharger including: a rotary shaft, a turbine wheel coupled to one end side of the rotary shaft, a compressor wheel coupled to the other end side of the rotary shaft, and the electric motor including the motor rotor mounted on the rotary shaft.

The supercharger is provided with the aforementioned motor rotor. In the above motor rotor, the gap is interposed between the ring member and the magnet. According to this configuration, when the ring member is shrink-fitted to the inner sleeve, even if the ring member moves to the magnet side with contraction of the inner sleeve, the magnet is not pressed by the ring member. Therefore, no compressive force is generated in the magnet.

Further, a method of manufacturing a motor rotor according to still another aspect of the present disclosure includes a step of inserting the inner sleeve through an opening portion of the magnet and mounting the magnet on the inner sleeve; and a step of inserting the inner sleeve through the opening portion of the ring member, disposing the ring member so as to be adjacent to the magnet in the axial direction of the inner sleeve, and shrink-fitting the ring member to the inner sleeve. In the step of shrink-fitting the ring member, a gap is provided between the ring member and the magnet in the axial direction of the inner sleeve to shrink-fit the ring member.

In the method of manufacturing the motor rotor, the gap is provided between the ring member and the magnet, and the ring member is shrink-fitted to the inner sleeve. Therefore, even if the ring member moves to the magnet side with the contraction of the inner sleeve, contact between the ring member and the magnet is prevented. Therefore, since the magnet is not pressed by the ring member, no compressive force is generated in the magnet.

Hereinafter, embodiments of the present disclosure will be described in detail with reference to the drawings. Incidentally, in each drawing, the same or corresponding parts are denoted by the same reference numerals, and repeated description will not be provided.

(Electric Supercharger)

An electric supercharger 1 illustrated in FIG. 1 is a supercharger for a vehicle. The electric supercharger 1 compresses air to be supplied to an engine (not illustrated), using an exhaust gas discharged from the engine. The electric supercharger 1 includes a turbine 2, a compressor (a centrifugal compressor) 3, and an electric motor 4. The electric motor 4 applies a rotational driving force to a rotary shaft 5. The rotary shaft 5 is connected to the compressor wheel 9 of the compressor 3.

The turbine 2 includes a turbine housing 6 and a turbine wheel 8. The turbine wheel 8 is accommodated in the turbine housing 6. The compressor 3 includes a compressor housing 7 and a compressor wheel 9. The compressor wheel 9 is accommodated in the compressor housing 7.

The turbine wheel 8 is provided at one end of the rotary shaft 5. The compressor wheel 9 is provided at the other end of the rotary shaft 5. Further, the bearing 10 and the electric motor 4 are provided between the turbine wheel 8 and the compressor wheel 9 in a direction of an axis $L_5$ of the rotary shaft 5.

The bearing housing 11 is provided between the turbine housing 6 and the compressor housing 7. The rotary shaft 5 is rotatably supported by the bearing housing 11 via the bearing 10.

The turbine housing 6 is provided with an exhaust gas inlet (not illustrated) and an exhaust gas outlet 13. The exhaust gas discharged from the engine flows into the turbine housing 6 through the exhaust gas inlet. Further, the exhaust gas rotates the turbine wheel 8. Thereafter, the exhaust gas flows out of the turbine housing 6 through the exhaust gas outlet 13.

The compressor housing 7 is provided with a suction port 14 and a discharge port (not illustrated). When the turbine wheel 8 rotates as described above, the rotary shaft 5 and the compressor wheel 9 rotate. The rotating compressor wheel 9 sucks the outside air through the suction port 14. The compressor wheel 9 compresses the sucked air and discharges it from the discharge port. The compressed air discharged from the discharge port is supplied to the engine.

(Electric Motor)

The electric motor 4 is, for example, a brushless AC electric motor. The electric motor 4 includes a motor rotor 16 which is a rotor, and a motor stator 17 which is a stator. The motor rotor 16 is fixed to the rotary shaft 5. The motor rotor 16 is rotatable about an axis together with the rotary shaft 5. The motor rotor 16 is disposed between the bearing 10 and the compressor wheel 9 in the direction of the axis $L_5$ of the rotary shaft 5.

The motor stator 17 includes a plurality of coils and an iron core. The motor stator 17 is disposed to surround the motor rotor 16 in the circumferential direction of the rotary shaft 5. The motor stator 17 is accommodated in the bearing housing 11. The motor stator 17 generates a magnetic field around the rotary shaft 5 to rotate the motor rotor 16.

The electric motor 4 corresponds with high-speed rotation (for example, 100,000 rpm to 200,000 rpm) of the rotary shaft 5. The electric motor 4 may be able to perform rotational driving at the time of acceleration and regenerative operation at the time of deceleration. Further, the driving voltage of the electric motor 4 may be the same as or higher than the DC voltage of the battery mounted on the vehicle.

(Motor Rotor)

Figure 2:
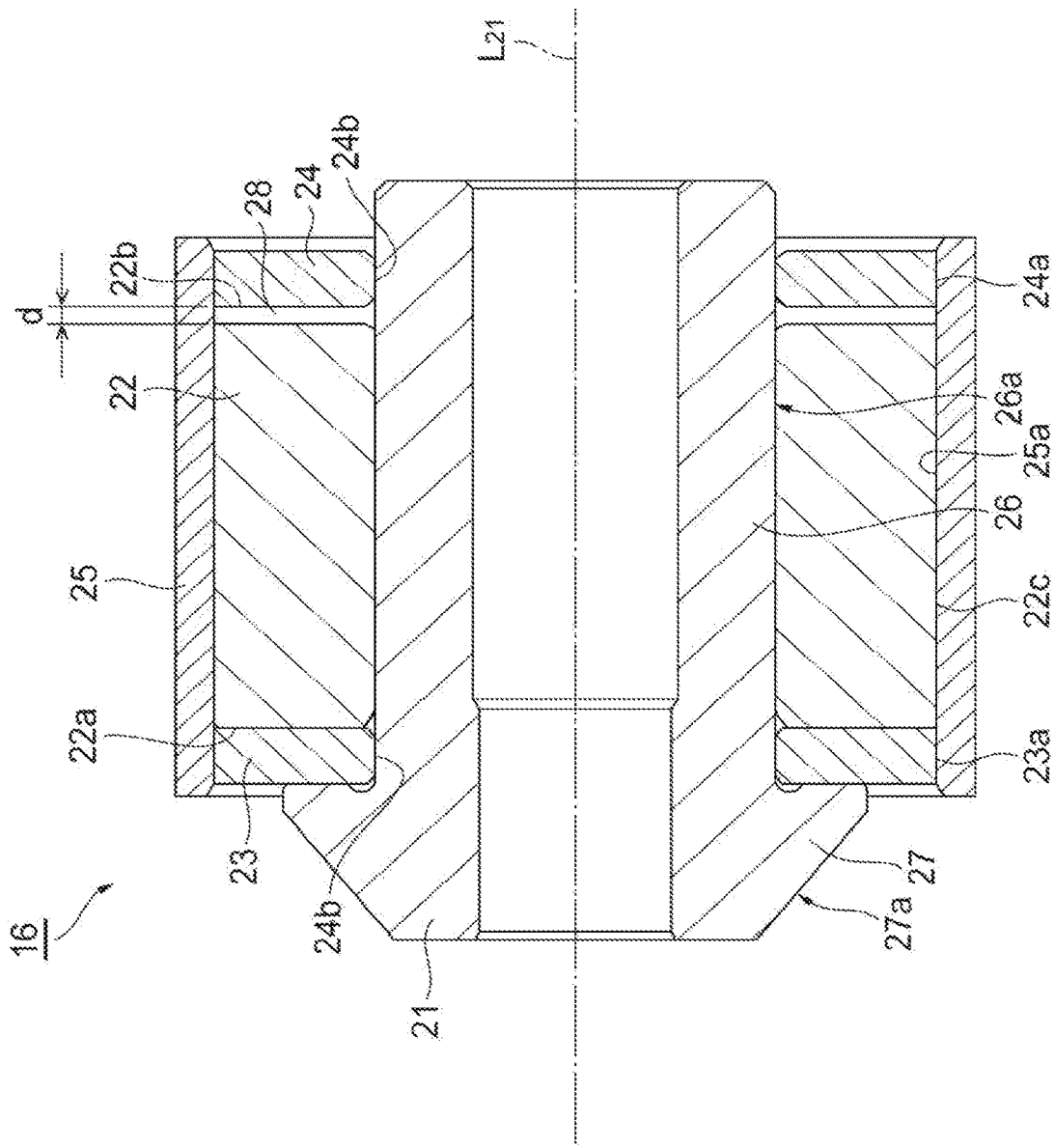
FIG. 2 is an enlarged sectional view of the motor rotor in FIG. 1.

Next, the motor rotor 16 will be described with reference to FIG. 2. FIG. 2 is an enlarged sectional view of the motor rotor 16 in FIG. 1. Incidentally, FIG. 2 illustrates a cut surface which is taken in the axial direction of the motor rotor 16. The motor rotor 16 includes an inner sleeve 21, a magnet (an annular magnet) 22, a pair of end rings (ring members) 23 and 24, and an armoring (an exterior member) 25. The magnet 22 has, for example, a cylindrical shape.

As the material of the inner sleeve 21, for example, stainless steel or the like can be adopted. As the material of the end rings 23 and 24, for example, stainless steel or the like can be adopted. As a material of the armoring 25, for example, high alloy steel or the like can be adopted. Further, as the material of the magnet 22, for example, a neodymium magnet or the like can be adopted. Further, the linear expansion coefficient of the inner sleeve 21 is higher than the linear expansion coefficient of the magnet 22.

The inner sleeve 21 includes a cylindrical portion 26 and a flange portion 27. The rotary shaft 5 is inserted into the opening portion of the cylindrical portion 26. The cylindrical portion 26 extends in the direction of the axis $L_5$ of the rotary shaft 5. In a direction of an axis $L_{21}$ of the inner sleeve 21, the cylindrical portion 26 is longer than the magnet 22. The cylindrical portion 26 extends to a position on the outside of the magnet 22.

The flange portion 27 is provided on one end side of the cylindrical portion 26 in the direction of the axis $L_{21}$. The flange portion 27 protrudes to the outer side in the radial direction from an outer peripheral surface 26a of the cylindrical portion 26. The flange portion 27 is disposed on the outside of the magnet 22 in the direction of the axis $L_{21}$. For example, an outer peripheral surface 27a of the flange portion 27 is inclined with respect to the axis $L_{21}$ of the inner sleeve 21. The outer peripheral surface 27a of the flange portion 27 is disposed on the outer side in the radial direction of the axis $L_{21}$ from the one end side (a left side in the drawing) toward the other end side (a right side in the drawing). In a state in which the inner sleeve 21 is mounted on the rotary shaft 5, one end side of the inner sleeve 21 is disposed on the turbine wheel 8 side. The other end side of the inner sleeve 21 is disposed on the compressor wheel 9 side.

The pair of end rings 23 and 24 is disposed on both sides of the magnet 22 with the magnet 22 interposed therebetween in the direction of the axis $L_{21}$ of the inner sleeve 21. The pair of end rings 23 and 24 is disposed on the outside of the magnet 22 in the direction of the axis $L_{21}$. The pair of end rings 23 and 24 is disposed to cover the end surfaces 22a and 22b of the magnet 22 in the direction of the axis $L_{21}$. The end surface 22a is an end surface on one end side in the direction of the axis $L_{21}$. The end surface 22b is an end surface on the other end side in the direction of the axis $L_{21}$. The end ring 23 is disposed to face the end surface 22a. The end ring 24 is disposed to face the end surface 22b.

The cylindrical portion 26 of the inner sleeve 21 is inserted into the opening portions of the magnet 22 and the pair of end rings 23 and 24. The magnet 22 is mounted on the outer side of the inner sleeve 21 in the radial direction of the inner sleeve 21. The pair of end rings 23 and 24 is shrink-fitted to the inner sleeve 21. The pair of end rings 23 and 24 is mounted on the outer side of the inner sleeve 21 in the radial direction of the inner sleeve 21. The inner peripheral surfaces 23b and 24b of the end rings 23 and 24 are in close contact with the outer peripheral surface 26a of the cylindrical portion 26 of the inner sleeve 21.

The end ring 23 covers the end surface 22a on the flange portion 27 side of the magnet 22. The end ring 24 covers the end surface 22b on the side opposite to the flange portion 27 of the magnet 22.

The outer peripheral surface 22c of the magnet 22 and the outer peripheral surfaces 23a and 24a of the pair of end rings 23 and 24 are formed at substantially the same position in the radial direction of the rotary shaft 5.

The armoring 25 has a cylindrical shape. The magnet 22 and the pair of end rings 23 and 24 are disposed on the inside of the opening portion of the armoring 25. The armoring 25 covers the outer peripheral surface 22c of the magnet 22 and the outer peripheral surfaces 23a and 24a of the pair of end rings 23 and 24. The armoring 25 extends to a position on the outside of the pair of end rings 23 and 24 in the direction of the axis $L_{21}$ of the inner sleeve 21. The armoring 25 covers the magnet 22 and the pair of end rings 23 and 24 over the entire circumference.

The armoring 25 is shrink-fitted to the pair of end rings 23 and 24 and the magnet 22. The inner peripheral surface 25a of the armoring 25 is brought into close contact with the outer peripheral surfaces 23a and 24a of the pair of end rings 23 and 24 and the outer peripheral surface 22c of the magnet 22.

The magnet 22 is covered with end rings 23 and 24 from both sides in the direction of the axis $L_{21}$. The magnet 22 is covered with the armoring 25 from the outside in the radial direction. With this configuration, the magnet 22 is protected.

Here, in the direction of the axis $L_{21}$, a gap 28 is formed between the magnet 22 and the end ring 24. The gap 28 is formed over the entire circumference of the inner sleeve 21. That is, the end surface 22b of the magnet 22 faces the end surface of the end ring 24 in the direction of the axis $L_{21}$. The end surface 22b of the magnet 22 is not in contact with the end surface of the end ring 24 in the entire circumference of the inner sleeve 21. Incidentally, the other end ring 23 may be in contact with the magnet 22 in the direction of the axis $L_{21}$. The other end ring 23 may not be in contact with the magnet 22 in the direction of the axis $L_{21}$.

(Method of Manufacturing Motor Rotor)

Next, a method of manufacturing the motor rotor 16 will be described with reference to FIG. 3. First, as illustrated in FIG. 3(a), the inner sleeve 21 is prepared. For example, the inner sleeve 21 is disposed so that the flange portion 27 is disposed in a lower part and the direction of the axis $L_{21}$ of the inner sleeve 21 extends along the vertical direction. Incidentally, the arrangement of the inner sleeve 21 is not limited to a case where the flange portion 27 is disposed in a lower part. The flange portion 27 of the inner sleeve 21 may be disposed in an upper part. Further, the direction of the axis $L_{21}$ of the inner sleeve 21 may be disposed to extend along other directions.

Next, as illustrated in FIG. 3(b), the end ring 23 is shrink-fitted to the cylindrical portion 26 of the inner sleeve 21. Specifically, the cylindrical portion 26 is inserted through the opening portion of the end ring 23, and the end ring 23 is shrink-fitted to the cylindrical portion 26 of the inner sleeve 21. Further, the end ring 23 of the heated state is cooled and contracted, thereby fastening the end ring 23 to the inner sleeve 21.

Next, as illustrated in FIG. 3(c), the magnet 22 is mounted on the cylindrical portion 26 of the inner sleeve 21 (a step of attaching the magnet to the inner sleeve). Specifically, the cylindrical portion 26 of the inner sleeve 21 is inserted through the opening portion of the magnet 22. At this time, the end ring 23 and the magnet 22 are disposed adjacent to each other in the direction of the axis $L_{21}$ of the inner sleeve 21.

Next, as illustrated in FIG. 3(d), the end ring 24 is shrink-fitted to the cylindrical portion 26 of the inner sleeve 21 (a step of shrink-fitting the ring member to the inner sleeve). Specifically, the cylindrical portion 26 is inserted through the opening portion of the end ring 24, and the end ring 24 is shrink-fitted to the cylindrical portion 26 of the inner sleeve 21. At this time, in the direction of the axis $L_{21}$, a gap 28 is provided between the magnet 22 and the end ring 24. A length d of the gap 28 in the direction of the axis $L_{21}$ can be calculated, for example, on the basis of a shrinkage-fit temperature, a linear expansion coefficient of the inner sleeve 21, a length of the inner sleeve 21 in the direction of the axis $L_{21}$, a linear expansion coefficient of the magnet 22, and a length of the direction of the axis $L_{21}$ of the magnet 22.

When the end ring 24 is disposed against the inner sleeve 21, for example, a dedicated jig may be used. According to this method, the gap 28 is reliably formed.

Further, the end ring 24 of the heated state is cooled and contracted, thereby fastening the end ring 24 to the inner sleeve 21.

Next, as illustrated in FIG. 3(e), the armoring 25 is shrink-fitted to the end rings 23 and 24 and the magnet 22. The inner sleeve 21, the magnet 22 and the end rings 23 and 24 are inserted through the opening portion of the armoring 25, and the armoring 25 is shrink-fitted. The armoring 25 of the heated state is cooled and contracted, thereby fastening the armoring 25 to the pair of end rings 23 and 24 and the magnet 22.

Next, the operation of the electric supercharger 1 will be described.

The exhaust gas flowing in from an exhaust gas inlet (not illustrated) passes through a turbine scroll flow passage 12a and is supplied to the inlet side of the turbine wheel 8. The turbine wheel 8 generates a rotational force, using the pressure of the supplied exhaust gas. The rotational force rotates the rotary shaft 5 and the compressor wheel 9 integrally with the turbine wheel 8. As a result, the air sucked from the suction port 14 of the compressor 3 is compressed by the compressor wheel 9. The air compressed by the compressor wheel 9 passes through the diffuser flow passage 7a and the compressor scroll flow passage 7b and is discharged from a discharge port (not illustrated). The air discharged from the discharge port is supplied to the engine.

The electric motor 4 of the electric supercharger 1 corresponds with high-speed rotation of the rotary shaft 5 (for example, 100,000 rpm to 200,000 rpm). For example, when the rotational torque of the rotary shaft 5 is insufficient at the time of acceleration of the vehicle, the electric motor 4 transmits the rotational torque to the rotary shaft 5. A battery of the vehicle can be applied as a driving source of the electric motor 4. Further, at the time of deceleration of the vehicle, the electric motor 4 may regenerate power by the rotational energy of the rotary shaft 5.

The electric motor 4 generates a magnetic field by the motor stator 17. The electric motor 4 generates a rotational force in the magnet 22 of the motor rotor 16 by the magnetic field. Further, the rotational force of the magnet 22 is transmitted to the rotary shaft 5 via the armoring 25 and the pair of end rings 23 and 24. As the rotary shaft 5 rotates, the compressor wheel 9 rotates. The rotating compressor wheel 9 compresses the air supplied to the engine.

In the motor rotor 16 of the present embodiment, when the end ring 24 is shrink-fitted to the inner sleeve 21, a gap 28 is interposed between the magnet 22 and the end ring 24. Therefore, the magnet 22 does not come into contact with the end ring 24.

That is, when the shrinkage-fit is performed, even if heat of the end ring 24 is transmitted to the inner sleeve 21 and the inner sleeve 21 contracts after cooling, since the gap 28 is interposed between the magnet 22 and the end ring 24, the magnet 22 is not pressed by the end ring 24. As a result, no compressive force is generated in the magnet 22, and it is possible to suppress occurrence of cracking in the magnet 22.

Incidentally, in the state in which the motor rotor 16 is manufactured, the magnet 22 and the pair of end rings 23 and 24 are covered with the armoring 25. Therefore, it is not possible to visually check whether or not the gap 28 is provided between the magnet 22 and the end ring 24.

In the case of checking that the gap 28 is provided between the magnet 22 and the end ring 24, for example, a non-destructive inspection can be applied. As the non-destructive inspection, for example, a radiation transmission test, an ultrasonic flaw detection test, or the like can be used. Thus, it is possible to discriminate the presence or absence of the gap 28 between the magnet 22 and the end ring 24 from the outside of the armoring 25.

The present disclosure is not limited to the above-described embodiments, and various modifications as described below can be made within the scope that does not depart from the gist of the present disclosure.

In the above embodiment, the configuration in which the flange portion 27 is provided on the inner sleeve 21 has been described. The inner sleeve 21 may have a configuration in which the flange portion 27 protruding to the outer side in the radial direction is not provided. The inner sleeve 21 may have other configurations. For example, in the inner sleeve 21, the inner sleeve 21 and the other member may be integrally formed. For example, the inner sleeve 21 may have a configuration in which the inner sleeve 21, one end ring 23, and the armoring 25 are integrally formed.

In the above embodiment, a case where the gap 28 is provided between the magnet 22 and the end ring 24 has been described. A configuration in which the gap 28 is provided between the magnet 22 and the end ring 23 may be adopted. A configuration in which the gap 28 is provided on both sides of the magnet 22 in the direction of the axis $L_{21}$ of the inner sleeve 21 may be adopted. A configuration in which the gap 28 is provided only on one side may be adopted.

Further, in the above embodiment, the electric supercharger 1 is exemplified as a supercharger for a vehicle. The electric supercharger 1 is not limited to a supercharger for a vehicle. The electric supercharger 1 may be used for a marine engine. The electric supercharger 1 may be used for other engines.

Further, in the above embodiment, the electric supercharger 1 is configured to include the turbine 2. The electric supercharger 1 may not be provided with the turbine 2 but may be driven by the electric motor 4.

Further, in the above embodiment, a case where the motor rotor 16 is applied to the electric motor 4 of the electric supercharger 1 has been described. The motor rotor 16 can be used not only for the electric supercharger but for other electric motors and may be used for the rotor of the generator.

REFERENCE SIGNS LIST

1: electric supercharger, 2: turbine, 3: compressor, 4: electric motor, 5: rotary shaft, 8: turbine wheel, 9: compressor wheel, 16: motor rotor, 21: inner sleeve, 22: magnet (annular magnet), 23, 24: end ring (ring member), 25: armoring (exterior member), 28: gap, $L_{21}$: axis of inner sleeve.

The invention claimed is:

1. A motor rotor comprising:
a tubular inner sleeve;
an annular magnet mounted on an outside of the inner sleeve in a radial direction of the inner sleeve; and
a first ring member and a second ring member disposed on an outside of the magnet in an axial direction of the inner sleeve so that the magnet is disposed between the first ring member and the second ring member, and the first ring member and the second ring member are mounted on the outside of the inner sleeve in the radial direction of the inner sleeve,
wherein a linear expansion coefficient of the inner sleeve is higher than a linear expansion coefficient of the magnet,
the first ring member and the second ring member are mounted on the inner sleeve by shrinkage-fitting,
the inner sleeve includes a cylindrical portion on which the magnet the first ring member, and the second ring member are arranged, and a flange portion provided on one end side of the cylindrical portion,
the first ring member is arranged on the one end side of the cylindrical portion being between the flange portion and the magnet,
the second ring member is arranged on another end side of the cylindrical portion, and
a gap is provided between the second ring member and the magnet in the axial direction of the inner sleeve.

2. The motor rotor according to claim 1, further comprising:

a tubular exterior member which covers the magnet and the first ring member and the second ring member from an outer side in the radial direction of the inner sleeve.

3. A supercharger equipped with an electric motor including the motor rotor according to claim 1, the supercharger comprising:
a rotary shaft;
a turbine wheel coupled to one end side of the rotary shaft;
a compressor wheel coupled to the other end side of the rotary shaft; and
the electric motor including the motor rotor mounted on the rotary shaft.

4. A supercharger equipped with an electric motor including the motor rotor according to claim 2, the supercharger comprising:
a rotary shaft;
a turbine wheel coupled to one end side of the rotary shaft;
a compressor wheel coupled to the other end side of the rotary shaft; and
the electric motor including the motor rotor mounted on the rotary shaft.

5. A method of manufacturing a motor rotor including:
a tubular inner sleeve;
an annular magnet mounted on an outside of the inner sleeve in a radial direction of the inner sleeve; and
a first ring member and a second ring member disposed on an outside of the magnet in an axial direction of the inner sleeve so that the magnet is disposed between the first ring member and the second ring member, and the first ring member and the second ring member are mounted on the outside of the inner sleeve in the radial direction of the inner sleeve,
a linear expansion coefficient of the inner sleeve being higher than a linear expansion coefficient of the magnet,
the inner sleeve includes a cylindrical portion on which the magnet, the first ring member, and the second ring member are arranged, and a flange portion provided on one end side of the cylindrical portion,
the method of manufacturing the motor rotor comprising:
a first step of inserting the inner sleeve through an opening portion of the first ring member, disposing the first ring member on a flange portion side, and shrink-fitting the first ring member to the inner sleeve;
a second step of inserting the inner sleeve through an opening portion of the magnet and mounting the magnet on the inner sleeve; and
a third step of inserting the inner sleeve through the opening portion of the second ring member, disposing the second ring member so as to be adjacent to the magnet in the axial direction of the inner sleeve, and shrink-fitting the second ring member to the inner sleeve,
wherein, in the third step of shrink-fitting the second ring member, a gap is provided between the second ring member and the magnet in the axial direction of the inner sleeve to shrink-fit the second ring member.

6. The motor rotor according to claim 2, wherein an the tubular exterior member extends in the axial direction beyond the first ring member and the second ring member.

* * * * *